US008773434B2

(12) United States Patent
Budge et al.

(10) Patent No.: US 8,773,434 B2
(45) Date of Patent: Jul. 8, 2014

(54) DIRECTING INDIRECT ILLUMINATION TO VISIBLY INFLUENCED SCENE REGIONS

(75) Inventors: Brian Christopher Budge, Tiburon, CA (US); Adam Joseph Arbree, Tiburon, CA (US)

(73) Assignee: Autodesk, Inc., San Rafael, CA (US)

( * ) Notice: Subject to any disclaimer, the term of this patent is extended or adjusted under 35 U.S.C. 154(b) by 495 days.

(21) Appl. No.: 13/116,948

(22) Filed: May 26, 2011

(65) Prior Publication Data

US 2012/0299921 A1   Nov. 29, 2012

(51) Int. Cl.
*G06T 15/50* (2011.01)
*G06T 15/00* (2011.01)
*G06T 1/00* (2006.01)

(52) U.S. Cl.
USPC ............................ 345/426; 345/419; 345/418

(58) Field of Classification Search
CPC ...... G06T 15/06; G06T 15/50; G06T 2210/56
See application file for complete search history.

(56) References Cited

U.S. PATENT DOCUMENTS

| 7,408,550 | B2 * | 8/2008 | Bunnell | 345/426 |
| 7,755,627 | B2 * | 7/2010 | Anderson et al. | 345/426 |
| 2008/0150938 | A1 * | 6/2008 | Pantaleoni | 345/419 |
| 2009/0167763 | A1 * | 7/2009 | Waechter et al. | 345/426 |

OTHER PUBLICATIONS

Jensen et al. A Practical Guide to Global Illumination using Photon Mapping. In SIGGRAPH'2001, Course #38, Aug. 14, 2001.*
Kinkelin et al. Instant Radiosity An Approach for Real-Time Global Illumination. Forschungsseminar aus Computergraphik und Digitaler Bildverarbeitung (Research Seminar in Computer Graphics and Digital Image Processing). 2008.*
Keller, Alexander. "Instant radiosity." Proceedings of the 24th annual conference on Computer graphics and interactive techniques. ACM Press/Addison-Wesley Publishing Co., 1997.*
Novak, Jan, et al. "Virtual ray lights for rendering scenes with participating media." ACM Transactions on Graphics (TOG) 31.4 (2012): 60.*
Peter, Ingmar, and Georg Pietrek. Importance driven construction of photon maps. Springer Vienna, 1998.*
Christensen, Per H. "Adjoints and importance in rendering: An overview." Visualization and Computer Graphics, IEEE Transactions on 9.3 (2003): 329-340.*
Agarwal, Sameer, et al. "Structured importance sampling of environment maps." ACM Transactions on Graphics (TOG), vol. 22. No. 3. ACM, 2003.*

(Continued)

*Primary Examiner* — Kee M Tung
*Assistant Examiner* — Zhengxi Liu
(74) *Attorney, Agent, or Firm* — Gates & Cooper LLP

(57) ABSTRACT

A method, apparatus, system, and computer readable storage medium provide the ability to conduct global illumination. A 3D model of a scene is obtained in a computer graphics application. A camera location in the scene is identified and paths emitted from the camera location are traced into the scene (by recording hit points along the paths). The paths are filtered by selecting those paths that can receive light from a light source (i.e., paths whose next path segment hits the light source). Targets are identified based on the hit points. Photons are generated from the light source and follow a corresponding photon path. Each photon path is evaluated to determine if it intersects with a target, in which case it is recorded. A view of the scene is rendered based on the recorded photons.

21 Claims, 4 Drawing Sheets

(56) References Cited

OTHER PUBLICATIONS

Wang, Rui, and Oskar Åkerlund. "Bidirectional importance sampling for unstructured direct illumination." Computer Graphics Forum. vol. 28. No. 2. Blackwell Publishing Ltd, 2009.*

Wald, Ingo, Carsten Benthin, and Philipp Slusallek. "Interactive global illumination in complex and highly occluded environments." Proceedings of the 14th Eurographics workshop on Rendering. Eurographics Association, 2003.*

Georgiev, Iliyan, and Philipp Slusallek. "Simple and robust iterative importance sampling of virtual point lights." Proceedings of Eurographics. vol. 3. 2010.*

* cited by examiner

DIRECTING INDIRECT ILLUMINATION TO VISIBLY INFLUENCED SCENE REGIONS

BACKGROUND OF THE INVENTION

1. Field of the Invention

The present invention relates generally to lighting a three-dimensional (3D) model, and in particular, to a method, apparatus, and article of manufacture for indirectly illuminating particular scene regions.

2. Description of the Related Art

Rendering algorithms often trace light particles from a scene's light sources as part of the scene's calculation of global illumination (photon mapping, instant radiosity, lightcuts, etc.). Generating these particle paths is a difficult problem because, in expansive cases, much of the scene is not even indirectly viewable from the camera. If a particle set could be restricted to only the regions affecting the camera, the set of stored photons becomes much smaller and later operations using these photons become more efficient. This increased efficiency translates into faster rendering times and increased rendering quality. The prior art fails to provide a mechanism for generating particle paths in such a way that the indirect illumination garnered from the paths is likely to contribute to the final image. Such problems may be better understood with a description of prior art lighting techniques.

Many applications attempt to perform simulated photography in a large scene. In other words, the application simulates the placement of a camera at a particular location in a scene and attempts to illuminate the scene (referred to as global illumination). Further, the light received at the camera's location must have a sufficient density to produce an accurate/acceptable rendering. As part of the illumination process, paths between the camera and the light source(s) are computed. If the path is complicated, there may not be sufficient density or enough paths relative to the entire scene (e.g., millions of paths in the scene but only a few that reach the camera location). For example, the camera may be located in a single room of a multi-room hotel looking out a window. Prior art global illumination techniques do not take the camera's location into account and may therefore insufficiently illuminate the hotel room where the camera is located (i.e., for simulated light). More specifically, the global illumination computation will consume processing resources by globally illuminating the scene without regard to a targeted area such as a camera's location. Accordingly, it is useful to label the camera's location in a scene and bias the scene illumination based on such a location. In other words, it is desirable to isolate a small important subset of the global illumination computation. However, prior art methodologies fail to perform global computations with such a bias. To better understand global illumination, a description of prior art global illumination computations is useful.

Two different types of prior art are often utilized to compute global illumination—geometric based computations (e.g., progressive radiosity) and lighting based computations.

In geometric based prior art solutions, the geometric representations of areas not important in the scene are computed at a low quality or are actually modified to produce more/fewer vertices for use in the analysis. Thus, the geometry of a scene is analyzed and the rendering of non-important geometry may be performed at a reduced resolution/quality.

Most prior art systems that compute global illumination are lighting based. One such method utilizes virtual point lights (VPLs). A VPL is a point light source that is placed virtually in a scene location. A VPL is used as a source of light and may not be the originating light source. For example, if the light source is the sun that reflects or bounces off many objects in a scene (e.g., ground, window, wall, etc.), during a process of forward ray tracing (i.e. tracing rays from light sources) a VPL may be placed at any of the intersecting/reflecting locations (e.g., on the ground, window, wall, etc.). To use the VPLs, they must first be created. In a small scene, (e.g., a light source and a single room with a window), many VPLs can be projected into the scene with sufficient density to obtain a reasonable estimate of global illumination. However, many applications attempt to compute global illumination in a large scene (e.g., 1 mile by 1 mile with a camera in one room of a large house that has a window to the outside, or to a multi-room hotel). While millions of VPLs may be traced, the density in the room with the camera may be very low and insufficient. Thus, prior art methods fail to provide an efficient mechanism for computing global illumination that is biased in a particular location.

Another prior art approach is that of traditional ray tracing or backward ray tracing. Ray tracing is a technique that models the path taken by light by following rays of light as they interact with optical surfaces. In a 3D graphics environment, backward ray tracing follows rays from the camera eyepoint outward, rather than originating at a light source. Thus, visual information on the appearance of the scene is viewed from the point of view of the camera, and lighting conditions specified are interpreted to produce a shading value. The ray's reflection, refraction, or absorption are calculated when it intersects objects and media in the scene.

Building on ray tracing is another prior art technique called photon mapping. Photon mapping is noted for its ability to handle caustics (specular indirect effects) (e.g., rather than radiosity which is for diffuse indirect effects) as well as diffuse inter-reflection. Photon mapping uses forward ray tracing to deposit photons from the light sources into objects in the scene. The photons are stored in a binary space partitioning (BSP) tree data structure where neighbors can be quickly discovered and photons merged to constrain memory use. BSP is a method for recursively subdividing a space into convex sets by hyperplanes. The subdivision gives rise to a representation of the scene by means of a tree data structure referred to as the BSP tree. In the case of reflective or refractive objects, new photons are generated from the incoming set and further propagated through the scene, again using ray tracing, and the resulting photons are added to the tree. Each photon stored contains information including the direction the photon came from, where the photon hits a surface, and reflection properties at the surfaces.

A photon mapping algorithm usually proceeds in two phases. First a coarse illumination solution is prepared as described above. Second, the coarse illumination is "gathered," pixel by pixel, to produce a smooth final output. This gathering step requires many rays for quality results and is the subject of much research.

In many non-geometric based prior art solutions, global illumination is often analyzed in an unbiased context. Unbiased prior art techniques attempt to account for every path in a scene, a process that is computationally and processor intensive. Few prior art solutions use biased approaches to ensure relevant global illumination computations. One method that attempts to perform a bias based computation is that of "Importons". Importons are similar to "visual particles" that are emitted from the camera and bounce towards light. Importons move in the opposite direction to how photons travel but in contrast to photons, importons store color data that describes the factor with which an illumination at a certain location would contribute to the final image. Thus, with importons, the path is followed from the camera eyepoint, and importons are deposited at intersecting/bounce locations. Thereafter, photon mapping is performed. During the photon mapping (i.e., from the light source to the camera eyepoint), if a photon lands near an importons, it is stored, otherwise, the photon/location is ignored. Accordingly, since only particular photons are stored, the importons serve to bias the global illumination using photon mapping based on where importons are stored.

Global illumination may also be based on "daylight portals" to enable faster and better targeting for particle tracing. A daylight portal is a portal that is placed by the user (i.e., it is not automatically generated) and identifies a region of interest. These portals also present a major problem in scenes that are partially outdoors and partially indoors. Namely, using portals allows fast particle tracing into the indoor portion of the scene, but essentially disables global illumination due to the environment in outdoor portions of the scene. Portals can be disabled, allowing global illumination in all portions of the scene, but particle densities will be far from desirable (in large scenes, particles will be distributed over a large area). Moreover, even with portals, this density problem may occur, since portals may be located far from the camera, in other rooms, or even in other buildings. Thus, prior art solutions fail to allow particle densities to be relatively high in areas that actually contribute illumination to the final image.

In summary, the prior art global illumination computations have many deficiencies and problems. Geometric based prior art solutions modify scene geometry and are processor intensive. Unbiased lighting-based prior art solutions attempt to compute the global illumination for an entire scene and may reach the maximum capacity for memory/processor usage. The biased prior art computations focus on the final computation used during photon tracing/mapping and therefore also may exceed memory and processing limitations, or fail to have sufficient density of relevant data to compute a high quality global illumination solution.

In view of the above, one may note that all of the prior art solutions, whether geometric, lighting based, unbiased, or biased, fail to easily and efficiently illuminate a particular scene location without wasting precious memory and processing resources for illuminating an entire scene.

SUMMARY OF THE INVENTION

Embodiments of the invention are directed towards global illumination while focusing/targeting a region of interest. The location of the camera/eyepoint is used to influence and isolate the rendering computation for a final image in a sophisticated manner. Light is emitted from the camera/eyepoint in a reverse rendering process to identify targets in a scene. Thereafter, photons are projected/emitted from a light source. Only those photons that fall on photon paths that intersect with the targets are accepted and later utilized as virtual point lights to illuminate a region of interest in a scene.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
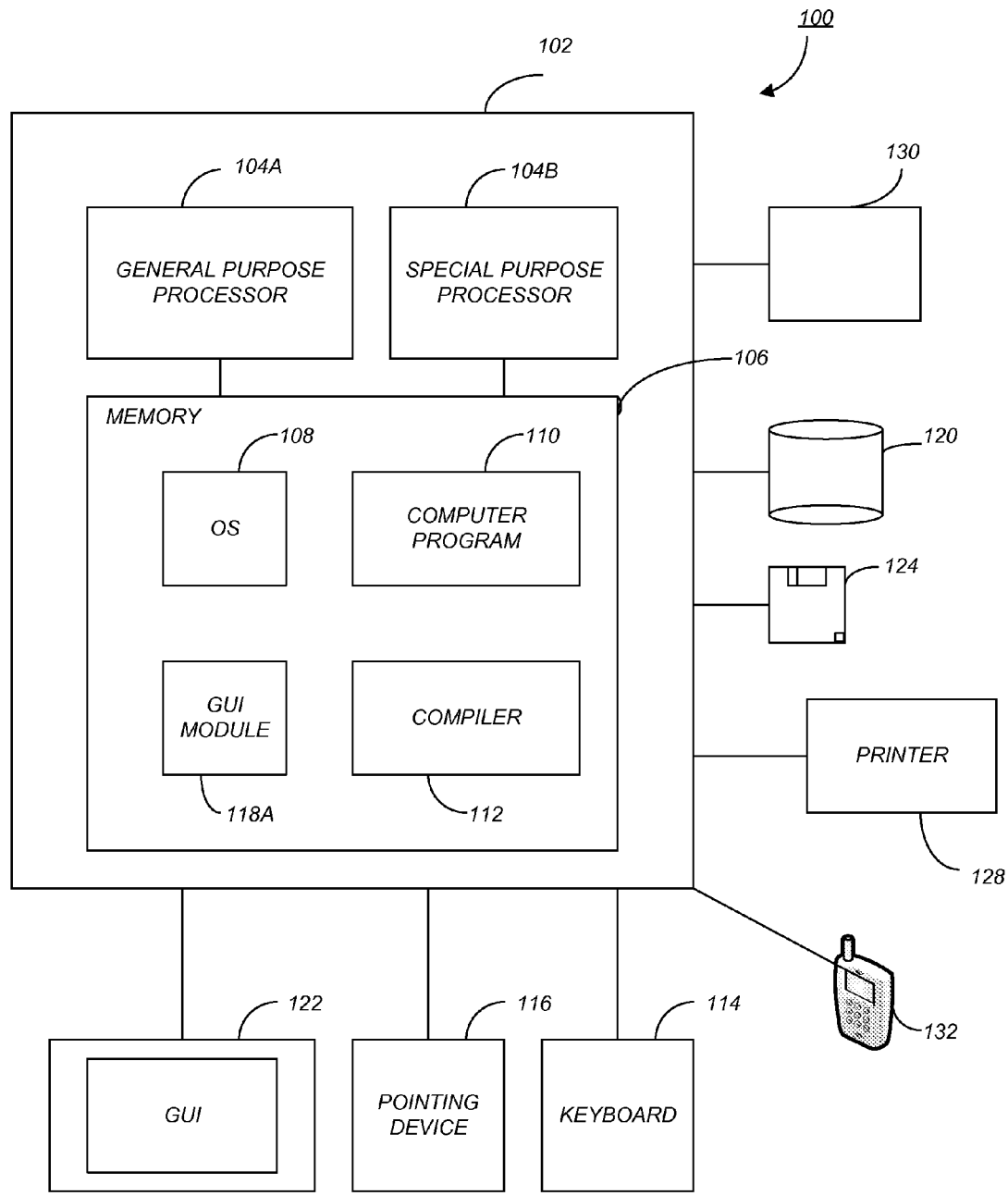
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The special purpose hardware processor 104B may consist of a graphics processing unit (GPU) or graphics card that may include substantial dedicated graphical processing capabilities, so that general purpose processor 104A is not burdened with computationally intensive tasks for which it is not optimized. Such a GPU may utilize proprietary code (referred to as a GPU program) that customized the operation and functionality of the GPU. As used herein, the term "GPU program" represents any and all types of programs that may be loaded and executed by a GPU, which includes (but is not limited to) fragment programs, vertex programs, and shaders or shader code (including fragment shaders, vertex shaders, and/or pixel shaders).

The computer 102 may be coupled to other devices, including input/output (I/O) devices such as a keyboard 114, a cursor control device 116 (e.g., a mouse, a pointing device, pen and tablet, etc.) and a printer 128. In one or more embodiments, computer 102 may be coupled to a portable or media viewing/listening device 132 (e.g., an MP3 player, iPod™, Nook™, portable digital video player, cellular device, personal digital assistant, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product, computer readable storage medium, or article of manufacture according to the invention. As such, the terms "article of manufacture," "program storage device", "computer readable storage medium", and "computer program product" as used herein are intended to encompass a computer program accessible from any non-transitory computer readable device or media.

Of course, those skilled in the art will recognize that any combination of the above components, or any number of different components, peripherals, and other devices, may be used with the computer 102.

Figure 2:
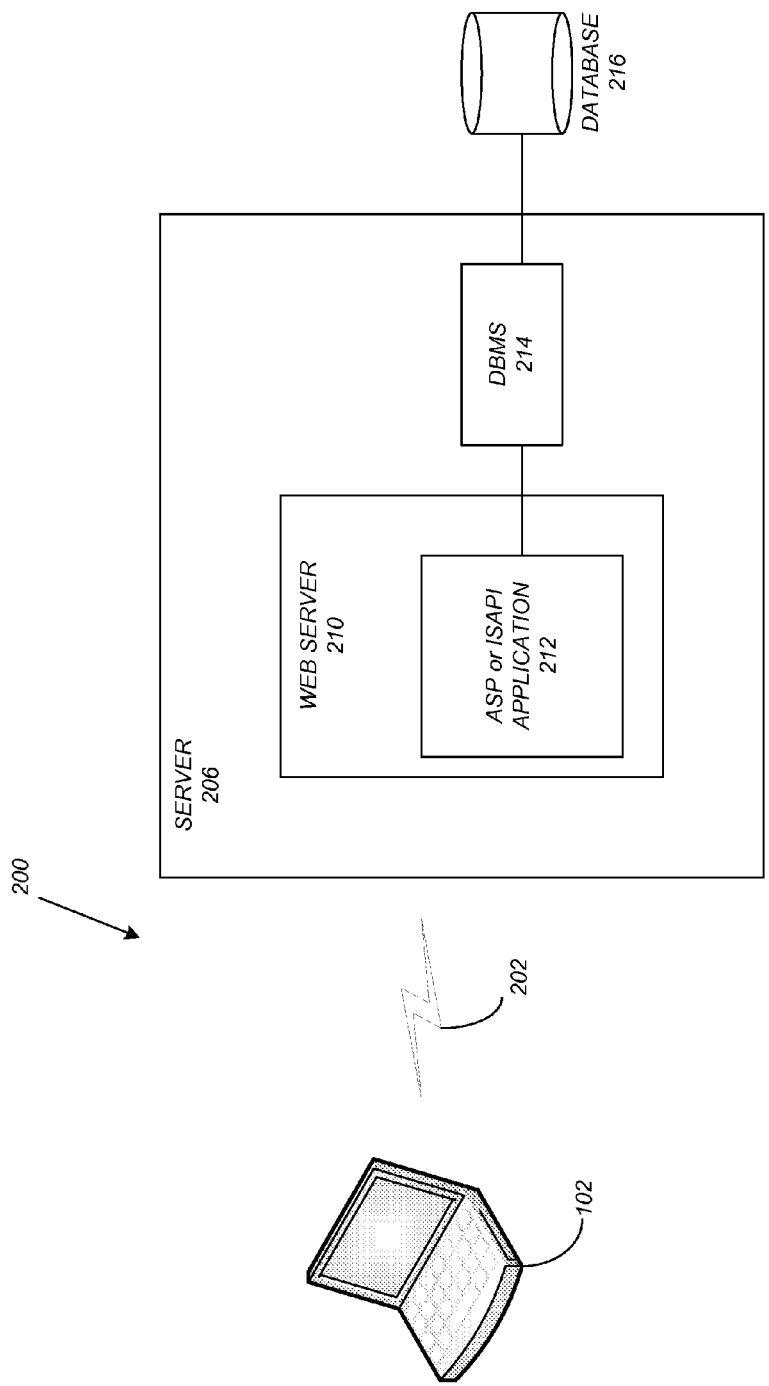
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, mini-computers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNENT INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 208-218 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include thin client devices with limited or full processing capabilities, portable devices such as cell phones, notebook computers, pocket computers, and/or any other device with suitable processing, communication, and input/output capability.

Of course, those skilled in the art will recognize that any combination of the above components, or any number of different components, peripherals, and other devices, may be used with computers 102 and 206.

Software Embodiments

Embodiments of the invention are implemented as a software application on a client 102 or server computer 206. The software application is likely a computer graphics application that is configured to globally illuminate a model (two-dimensional [2D] or three-dimensional [3D]) of a scene. As described above, rendering algorithms often trace light particles from the scene's light sources as part of their calculation of global illumination. Generating these particles is a difficult problem because, in expansive cases, much of the scene is not even indirectly viewable from the camera. Embodiments of the invention provide a mechanism for generating particle paths in such a way that the indirect illumination garnered from the paths is likely to contribute to the final rendered image.

Stated in other words, in rendering, a common lighting environment is to encase the scene in a bounding sphere (e.g., a mathematical sphere that is larger than the scene). Multiple light sources are placed on the sphere and emit light at/towards the scene. Since the light sources are far away from the scene, light can hit any exterior surface in the scene. Further, because the scene is larger than the location of a particular camera/eyepoint within the scene, the probability that light from the light source will end up near the camera/eyepoint is small. The process of generating a source light on a sphere and connecting the emitted light to the scene is an inexpensive calculation. Thereafter, the further calculation and use of the resulting point to determine where the light reaches and to illuminate the scene is an expensive calculation—the light has to be traced around the scene to determine where it ends up and then light needs to be gathered into a camera from the ending location.

To better understand embodiments of the invention, a specific intuitive example may be used. Rendering often shoots photons from an infinite sky dome referred to as the environment map. Imagine the scene is an interior room in a house lit from this environment through a single window. A goal of embodiments of the invention is to automatically restrict environment photon tracing to only those paths that pass through the window.

In another example, imagine taking a photograph of the mountains from one hundred (100) miles away. Any point on the mountain is going to be the same direction, more or less, from your position because it is so far away. Environment mapping uses a similar principal where a sphere is drawn around the scene and is considered an infinite distance from the scene.

Figure 3:
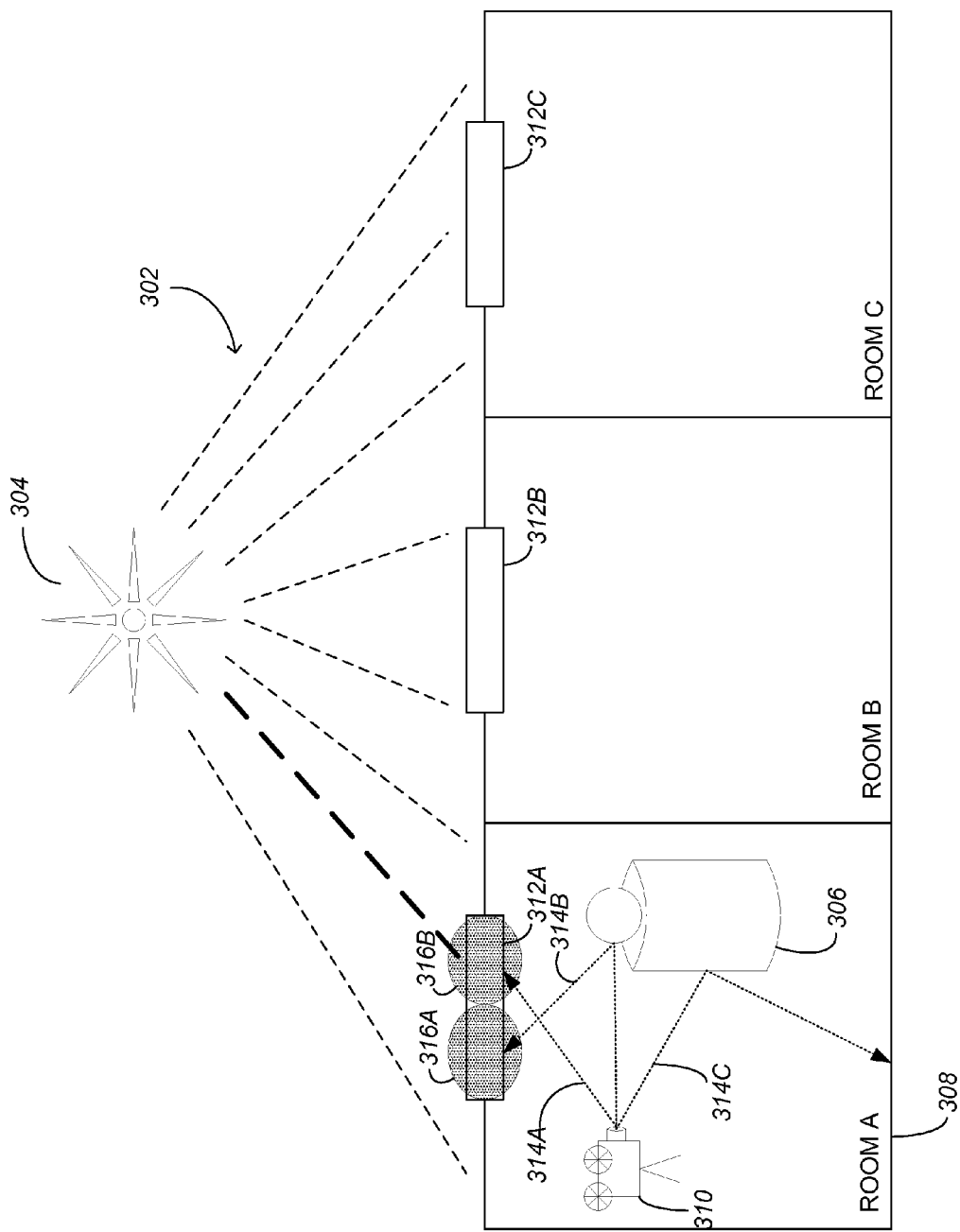
FIG. 3 illustrates an example of a hotel having multiple rooms with a camera located in a single room with windows to the outside in accordance with one or more embodiments of the invention.

FIG. 3 illustrates another example of a hotel having multiple rooms with a camera located in a single room with windows to the outside. As illustrated, photons 302 are emitted from a light source 304 and bounce around a scene. The photons 302 can be deposited on the outside of surfaces (e.g. outside of the rooms, inside of the rooms, on object 306, etc.) and become virtual point lights (VPLs) that can be used to light the scene. Based on memory and processing limitations, there is a limited budget for the number of VPLs that can be processed. Accordingly, it is desirable to focus VPLs into a desirable area or an area of the scene that is considered the region of interest (e.g., room A 308). Embodiments of the invention attempt to focus the VPLs and photons by labeling a location in the scene where the camera/viewpoint 310 is located such that the rendering application only considers light/photons/VPLs that are relevant to the region of interest 308.

Thus, continuing with the example from FIG. 3, the goal is to only produce light paths 302 passing into Room A 308. To perform the labeling, a reverse lighting simulation is conducted in Room A 308 to identify objects 306 seen from the camera 310. In other words, the camera 310 is treated as a light source such that light 314A-C is traced/projected/emitted from the camera 310 into the scene. Some light 314 will pass out of the window 312A and all paths 314 that leave the camera 310 are recorded. Each path 314 is defined by a series of sections/segments with points. The whole collection of paths 314 will represent some part of the scene that is of interest. In FIG. 3, the paths 314 do not include the other rooms (i.e., Room B and Room C).

Once the paths 314 have been determined/recorded (or as part of the recording process) a filtering is conducted to determine which paths 314 are relevant. Embodiments of the invention determine that those paths 314 whose next-to-last entry leaves the scene/environment. In the example illustrated, such next-to-last points are identified as those that hit the glass of window 312A. Consequently, the paths 314 are filtered and the next-to-last points are isolated and resolved as targets 316A and 316B. Such targets 316 may not be on windows 312 but could be on the ground outside of the window (e.g., if light reflects off the ground before leaving the environment), on a wall inside the room (if there is no window), etc. Thus, the last point on the path in the scene before hitting the environment is labeled as a target 316. By repeating the labeling of the points numerous times, the target 316 may be determined (e.g., the window 312A is essentially painted as a target 316).

Once the targets 316 and paths 302 have been determined, the next step is to determine how to illuminate the scene. When light passes through a window 312, the light hits the wall and is colored/interacts with objects 306 in the room 308. Such a secondary illumination is important to the overall quality of the image/global illumination of the scene. Accordingly, it is desirable to approximate the total global illumination (which includes the secondary illumination). To provide such an approximation, VPLs may be used. However, similar to that described above, it is desirable to only create/use VPLs in the region of interest (i.e., Room A 308). Prior art solutions have not focused on, nor selected, VPLs based on a region of interest. Instead, prior art users were relied upon to manually identify a region of interest and manually place a light source where desired. However, embodiments of the present invention automatically, and without additional user input, perform the reverse rendering process as described above to label points and establish targets.

With the targets 316 and plethora of paths 302, embodiments of the invention filter/select only those VPLs that lie on paths 302 that hit the target(s) 316. Such a filtering/selection of paths 302 serves to limit the number of VPLs on which computations are performed thereby significantly expediting the processing.

Logical Flow

As described above, the process for conducting global illumination may be viewed as a two-phase process. The first phase automatically generates targets in regions important to the current image. The second phase uses targets to reject photons that are not likely to affect the final rendered image.

Phase 1

As described above, to generate the targets, paths are traced from the eyepoint (e.g., similar to path tracing). The ray paths are permitted to bounce and terminate in an unbiased random fashion. All of the hit points are recorded along the paths. After tracing many paths, there are N records.

The records are filtered to restrict the hit points relevant to the current targeting process. The filtering process can be arbitrary and allows the user to select the regions of the scene of interest. For efficiency reasons, the filtering process may be combined with the tracing part within phase 1. For the environment example illustrated in FIG. 3, the filtering selects only those hit points whose next path segment hits the environment. The effect is to the record hit points only in the regions of the scene (e.g., Room A 308) that can receive light through the window 312 from the sky.

Once filtered, you have a set of points whose next segment leaves the scene or hits the environment (e.g., you have an exiting vector). Based on the set of points, the next step is that of identifying the targets 316. A method of determining where a cluster of the points lies is needed so that the target 316 can be labeled and the size of the target 316 can be determined.

One method of determining the targets 316 utilizes a spatial index of the records. Such a spatial index is an index identifying the distance between records. Accordingly, the first step is to build a spatial index of the records and determine the distances from records to their neighbors. Using these distances, disk-shaped targets centered at the records are created, and oriented such that the disk's normal aligns with (forms a positive dot products with) the path segment leaving that hit point. Using the normal of the disk is needed to determine the orientation of the disk/target 316. Determining the orientation is useful for phase 2 (see below) where only light emitted from an identified light source 304 (e.g., the sky) is accepted while light from the other side of the disk may be discarded.

The actual disk radii can be determined in many ways. In one implementation, the radius may be selected as the one that encloses some number (e.g., eight [8]) nearest neighbor records. Once the number of nearest neighbors have been identified, the average radius and the standard deviation is computed, and all of the radii are clamped to be a maximum of three standard deviations larger than average.

Once the targets 316 have been created, a ray tracing acceleration structure (e.g., a k-dimensional tree—a space-partitioning structure for organizing the targets in a k-dimensional space) is created to allow rapid queries of the intersection of line segments against the set of targets.

Phase 2

Phase 2 serves to replace the regular photon shooting phase in a rendering algorithm. Any method may be used to generate photons in accordance with the modifications described herein. Namely, before recording any photons from a path 302, one also tests the photon path 302 against the set of targets 316 and only accepts photons whose paths 302 strike a target 316 in a proper manner.

For the example of FIG. 3, those photons that hit the exterior of the hotel or rooms other than Room A 308 are rejected and only those photons that hit/pass through the window 312 are accepted. By construction, targets 316 cover the regions visible through the window 312 in the camera's 310 surrounding area 308. Thus, the acceptance test is that the photon must hit one of these targets 316 before any other scene geometry (e.g., object 306, window 312B, room B, room C, etc.). To accomplish this test, embodiments of the invention attempt to intersect the initial photon path segment 302 against all targets 316 before intersecting any scene geometry (with an epsilon offset to allow the path 302 to hit the disk target 316 before hitting coincident underlying geometry). If a target disk 316 is hit first and that hit intersection occurs so that the disk normal and the ray direction form a negative dot product (prevents light leaking through thin geometric walls), the photon path 302 is accepted and the particle can continue to be traced (e.g., as illustrated by the darker photon path 302 in FIG. 3). The other rejected photons 302 would logically have hit geometry exterior of the region of interest containing the camera 310 (since they cannot reach a target 316 before some other geometry) and therefore could not have contributed to the image.

Figure 4:
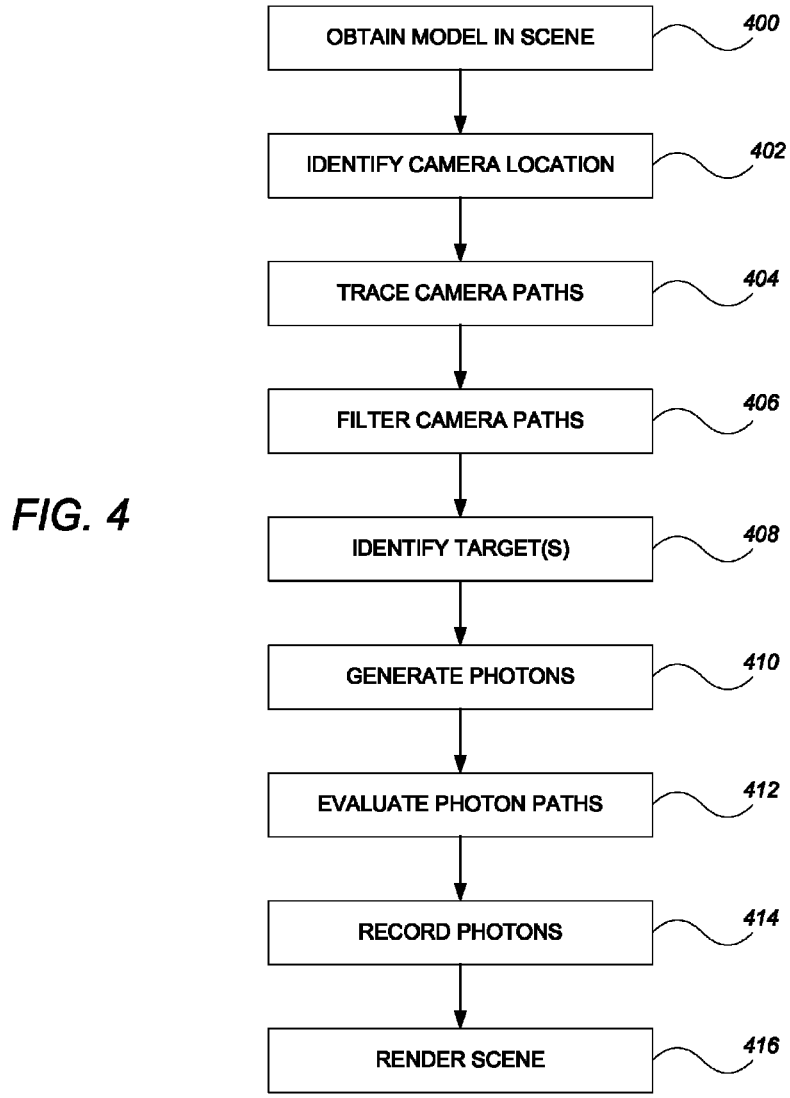
FIG. 4 is a flow chart illustrating the logical flow for conducting global illumination in accordance with one or more embodiments of the invention.

FIG. 4 is a flow chart illustrating the logical flow for conducting global illumination in accordance with one or more embodiments of the invention. At step 400, a 3D model of a scene is obtained in a computer graphics application.

At step 402, a camera location is identified in the scene.

At step 404, one or more paths are traced from the camera location into the scene. The tracing records one or more hit points along the paths.

At step 406, the paths are filtered by selecting those paths that can receive light from a light source. The selecting may select those hit points whose next path segment hits the light source.

At step 408, one or more targets are identified based on the selected hit points. The targeting process may include building a spatial index of the selected hit points, determining distances from each hit point to its neighbors, and creating (using the distances), targets centered at each selected hit point and oriented such that a normal of each target aligns with the next path segment that hits the light source. The size of each of the targets could be such that it encloses eight of the neighbors that are nearest to each selected hit point.

At step 410, photons are generated from the light source and follow a corresponding photon path. Such a light source may be an environment light source (e.g., an emulation of the sun) or an artificial light source (e.g., a light bulb).

At step 412, each photon path is evaluated to determine if the path intersects with a target. Such an evaluation may include building a ray tracing acceleration structure based on the targets. The structure may then be rapidly queried to determine if the path intersects with a target.

At step 414, photons whose path intersects with a target are recorded. The recorded photons may act as virtual point lights that are used to illuminate the scene (e.g., via secondary illumination), or as photons for photon mapping. The recording may also only record those photons whose corresponding paths intersect with a target prior to intersecting with any other scene geometry.

At step 416, a view of the scene is rendered based on the recorded photons.

ADDITIONAL EMBODIMENTS

Embodiments of the invention can make use of the targets 316 in many other ways beyond the scope of that described above. These different uses provide the ability to balance quality compared to efficiency during rendering. For example, the target hit rate can be initially estimated and the number of trial photon paths 302 can be adjusted to better account for rejection. Alternatively, the hit probability can be used to randomly accept/reject photon paths 302 rather than a complete rejection. Such options may increase the accuracy of the rendering process (while remaining unbiased) but potentially allows more unimportant photons into the accepted set. Additionally, the filter test and the rejection test may be arbitrary functions thereby providing the ability to generate targets and perform targeting for arbitrary photon shooting problems.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide the ability to target photons without user intervention. Such targeting significantly decreases the user's effort when rendering a scene. In addition, embodiments of the invention use the camera to determine the area of focus. Such a determination creates particle densities that are a better match to the final image contribution (even when compared to a naïve user's input using portals of the prior art). Accordingly, particle tracing efforts are more focused in areas that matter. This improved efficiency decreases rendering time and improves final image quality.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for conducting global illumination, comprising:
   (a) obtaining a three-dimensional (3D) model of a scene in a computer graphics application;
   (b) identifying a camera location in the scene;
   (c) tracing one or more paths emitted from the camera location into the scene, wherein the tracing comprises recording one or more hit points along the one or more paths;
   (d) filtering the one or more paths by selecting one or more of the one or more paths that can receive light from a light source, wherein the selecting comprises selecting the one or more hit points whose next path segment hits the light source;
   (e) identifying one or more targets based on the selected one or more hit points whose next path segment hits the light source;
   (f) generating one or more photons from the light source, wherein each photon follows a corresponding photon path;
   (g) evaluating each photon path to determine if the evaluated photon path intersects with one or more of the targets;
   (h) recording only those one or more of the one or more photons whose corresponding photon path intersects with one or more of the targets; and
   (i) rendering, on a display device, a view of the scene based on the one or more recorded photons.

2. The method of claim 1, further comprising:
   building a spatial index of the selected one or more hit points;
   determining distances from each selected hit point to one or more neighbors; and
   creating, using the distances, the one or more targets centered at each selected one or more hit points and oriented such that a normal of each of the one or more targets aligns with the next path segment that hits the light source.

3. The method of claim 2, wherein a size of each of the one or more targets encloses some number of the one or more neighbors that are nearest to each selected hit point.

4. The method of claim 2, further comprising:
   building a ray tracing acceleration structure based on the one or more targets; and
   rapidly querying the ray tracing acceleration structure to determine an intersection of line segments with the one or more targets.

5. The method of claim 1, wherein the light source comprises an environment light source.

6. The method of claim 1, wherein the one or more recorded photons act as virtual point lights (VPLs) that are used to illuminate the scene.

7. The method of claim 1, wherein the recording comprises only recording one or more of the one or more photons whose corresponding photon path intersects with the one or more targets prior to intersecting with any scene geometry.

8. An apparatus for conducting global illumination in a computer system comprising:
   (a) a computer having a memory; and
   (b) an application executing on the computer, wherein the application is configured to:
      (1) obtain a three-dimensional (3D) model of a scene in a computer graphics application;
      (2) identify a camera location in the scene;
      (3) trace one or more paths emitted from the camera location into the scene, wherein the tracing comprises recording one or more hit points along the one or more paths;
      (4) filter the one or more paths by selecting one or more of the one or more paths that can receive light from a light source, wherein the selecting comprises selecting the one or more hit points whose next path segment hits the light source;
      (5) identify one or more targets based on the selected one or more hit points whose next path segment hits the light source;
      (6) generate one or more photons from the light source, wherein each photon follows a corresponding photon path;
      (7) evaluate each photon path to determine if the evaluated photon path intersects with one or more of the targets;
      (8) record only those one or more of the one or more photons whose corresponding photon path intersects with one or more of the targets; and
      (9) render, on a display device, a view of the scene based on the one or more recorded photons.

9. The apparatus of claim 8, wherein the application is further configured to:
   build a spatial index of the selected one or more hit points;
   determine distances from each selected hit point to one or more neighbors; and
   create, using the distances, the one or more targets centered at each selected one or more hit points and oriented such that a normal of each of the one or more targets aligns with the next path segment that hits the light source.

10. The apparatus of claim 9, wherein a size of each of the one or more targets encloses some number of the one or more neighbors that are nearest to each selected hit point.

11. The apparatus of claim 9, wherein the application is further configured to:
   build a ray tracing acceleration structure based on the one or more targets; and
   rapidly query the ray tracing acceleration structure to determine an intersection of line segments with the one or more targets.

12. The apparatus of claim 8, wherein the light source comprises an environment light source.

13. The apparatus of claim 8, wherein the one or more recorded photons act as virtual point lights (VPLs) that are used to illuminate the scene.

14. The apparatus of claim 8, wherein the application is configured to record by only recording one or more of the one or more photons whose corresponding photon path intersects with the one or more targets prior to intersecting with any scene geometry.

15. A non-transitory computer readable storage medium encoded with computer program instructions which when accessed by a computer cause the computer to load the program instructions to a memory therein creating a special purpose data structure causing the computer to operate as a specially programmed computer, executing a method of conducting global illumination, comprising:
(a) obtaining, in the specially programmed computer, a three-dimensional (3D) model of a scene in a computer graphics application;
(b) identifying, in the specially programmed computer, a camera location in the scene;
(c) tracing, in the specially programmed computer, one or more paths emitted from the camera location into the scene, wherein the tracing comprises recording one or more hit points along the one or more paths;
(d) filtering, in the specially programmed computer, the one or more paths by selecting one or more of the one or more paths that can receive light from a light source, wherein the selecting comprises selecting the one or more hit points whose next path segment hits the light source;
(e) identifying, in the specially programmed computer, one or more targets based on the selected one or more hit points whose next path segment hits the light source;
(f) generating, in the specially programmed computer, one or more photons from the light source, wherein each photon follows a corresponding photon path;
(g) evaluating, in the specially programmed computer, each photon path to determine if the evaluated photon path intersects with one or more of the targets;
(h) recording, in the specially programmed computer, only those one or more of the one or more photons whose corresponding photon path intersects with one or more of the targets; and
(i) rendering, on a display device, in the specially programmed computer, a view of the scene based on the one or more recorded photons.

16. The non-transitory computer readable storage medium of claim 15, further comprising:
building, in the specially programmed computer, a spatial index of the selected one or more hit points;
determining, in the specially programmed computer, distances from each selected hit point to one or more neighbors; and
creating, in the specially programmed computer, using the distances, the one or more targets centered at each selected one or more hit points and oriented such that a normal of each of the one or more targets aligns with the next path segment that hits the light source.

17. The non-transitory computer readable storage medium of claim 16, wherein a size of each of the one or more targets encloses some number of the one or more neighbors that are nearest to each selected hit point.

18. The non-transitory computer readable storage medium of claim 16, further comprising:
building, in the specially programmed computer, a ray tracing acceleration structure based on the one or more targets; and
rapidly querying, in the specially programmed computer, the ray tracing acceleration structure to determine an intersection of line segments with the one or more targets.

19. The non-transitory computer readable storage medium of claim 15, wherein the light source comprises an environment light source.

20. The non-transitory computer readable storage medium of claim 15, wherein the one or more recorded photons act as virtual point lights (VPLs) that are used to illuminate the scene.

21. The non-transitory computer readable storage medium of claim 15, wherein the recording comprises only recording one or more of the one or more photons whose corresponding photon path intersects with the one or more targets prior to intersecting with any scene geometry.

* * * * *